US012521914B2

(12) United States Patent
Dark

(10) Patent No.: US 12,521,914 B2
(45) Date of Patent: Jan. 13, 2026

(54) MOLDING SYSTEM WITH A PLURALITY OF VENTS

(71) Applicant: The Boeing Company, Chicago, IL (US)

(72) Inventor: Stephen R. Dark, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1594 days.

(21) Appl. No.: 16/150,857

(22) Filed: Oct. 3, 2018

(65) Prior Publication Data

US 2020/0108525 A1 Apr. 9, 2020

(51) Int. Cl.
 *B29C 33/30* (2006.01)
 *B29C 33/00* (2006.01)
 *B29C 33/10* (2006.01)
 *B29C 43/36* (2006.01)
 *B29C 70/46* (2006.01)

(52) U.S. Cl.
 CPC .......... *B29C 33/306* (2013.01); *B29C 33/005* (2013.01); *B29C 33/10* (2013.01); *B29C 43/36* (2013.01); *B29C 70/46* (2013.01); *B29C 2043/3602* (2013.01); *B29C 2043/3665* (2013.01)

(58) Field of Classification Search
 CPC ..... B29C 33/306; B29C 33/005; B29C 33/10; B29C 33/485; B29C 33/48; B29C 33/76; B29C 43/42; B29C 43/36; B29C 70/46; B29C 70/345; B29C 2043/5007; B29C 2043/3665; B29C 2043/3602; B29C 45/4471; B29C 2043/425; B29D 99/0014; B29L 2031/3076
 See application file for complete search history.

(56) References Cited

U.S. PATENT DOCUMENTS

| | | | | |
|---|---|---|---|---|
| 3,266,099 A | * | 8/1966 | Bucy | B22D 17/14 249/141 |
| 4,359,443 A | * | 11/1982 | Michaels | B29C 33/0038 249/134 |
| 4,740,346 A | * | 4/1988 | Freeman | B29C 33/10 264/102 |
| 4,965,030 A | * | 10/1990 | Thorn | E06B 3/22 264/328.12 |
| 5,304,338 A | * | 4/1994 | Hertel | B29C 45/34 264/331.19 |
| 5,356,692 A | * | 10/1994 | Perez | B29C 33/30 118/33 |
| 2004/0241275 A1 | * | 12/2004 | Ryan | B29C 33/305 425/526 |
| 2017/0334096 A1 | * | 11/2017 | Westberg | B29C 43/42 |
| 2018/0043605 A1 | * | 2/2018 | Bischer | B29C 49/62 |

FOREIGN PATENT DOCUMENTS

| | | | | |
|---|---|---|---|---|
| GB | 927415 A | * | 5/1963 | B27N 5/00 |
| WO | WO2016135668 A1 | * | 9/2016 | |

* cited by examiner

*Primary Examiner* — Nicholas R Krasnow
(74) *Attorney, Agent, or Firm* — Yee & Associates, P.C.

(57) ABSTRACT

A molding system for forming a composite structure having trapped volumes is presented. The molding system comprises a plurality of removeable inserts, a bottom tool assembly, and a plurality of vents formed at a parting line of the molding system. Each removeable insert of the plurality of removeable inserts comprises a plurality of pieces configured to be disassembled for removal from the composite structure. Each removeable insert is configured to be placed in contact with the bottom tool assembly.

17 Claims, 7 Drawing Sheets

MOLDING SYSTEM WITH A PLURALITY OF VENTS

BACKGROUND INFORMATION

1. Field

The present disclosure relates generally to molding systems and, more specifically, to molding systems for forming structures with trapped volumes. Yet more specifically, the present disclosure relates to providing a molding system with a plurality of vents.

2. Background

Compression molding is a widely used manufacturing process utilizing pressure and sometimes heat to mold thermoplastic or thermoset materials into a desired shape. As shapes of resulting compression molded products become more complex, compression molding of the products becomes more difficult.

For example, as shapes of resulting compression molded products become more complex, removing the products from the compression mold becomes more difficult. As another example, as shapes of resulting compression molded products become more complex, achieving desirable quality for the products may become more difficult. For some compression molded products, filling the entirety of the composite structure is difficult. The shape of the composite structure, including the thickness, angle, or spacing of product walls may influence the difficulty of filling the compression mold. Therefore, it would be desirable to have a method and apparatus that take into account at east some of the issues discussed above, as well as other possible issues. For example, it would be desirable to provide a compression molding tooling that can provide a desired quality of the product.

SUMMARY

An illustrative example of the present disclosure provides a molding system for forming a composite structure having trapped volumes is presented. The molding system comprises a plurality of removeable inserts, a bottom tool assembly, and a plurality of vents formed at a parting line of the molding system. Each removeable insert of the plurality of removeable inserts comprises a plurality of pieces configured to be disassembled for removal from the composite structure. Each removeable insert is configured to be placed in contact with the bottom tool assembly.

Another illustrative example of the present disclosure provides a molding system for forming a composite structure having trapped volumes. The molding system comprises a plurality of removeable inserts, a bottom tool assembly, a parting line of the molding system formed by the bottom tool assembly and a compression chamber, and a plurality of vents. Each removeable insert of the plurality of removeable inserts comprises a plurality of pieces configured to be disassembled for removal from the composite structure. Each removeable insert is configured to be placed in contact with the bottom tool assembly. The plurality of vents is on a first side and a second side of the molding system along the parting line. The first side and the second side are opposing sides of the molding system.

Yet another illustrative example of the present disclosure provides a method of forming a composite structure using a molding system. A plurality of removeable inserts is placed against a bottom tool assembly of the molding system, each removeable insert of the plurality of removeable inserts comprising a plurality of pieces. A compression chamber of the molding system is placed in contact with the bottom tool assembly to form a parting line of the molding system with a plurality of vents formed at the parting line. A composite material is compressed within the molding system. The composite material is vented using the plurality of vents at the parting line during compression of the composite material.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

Figure 1:
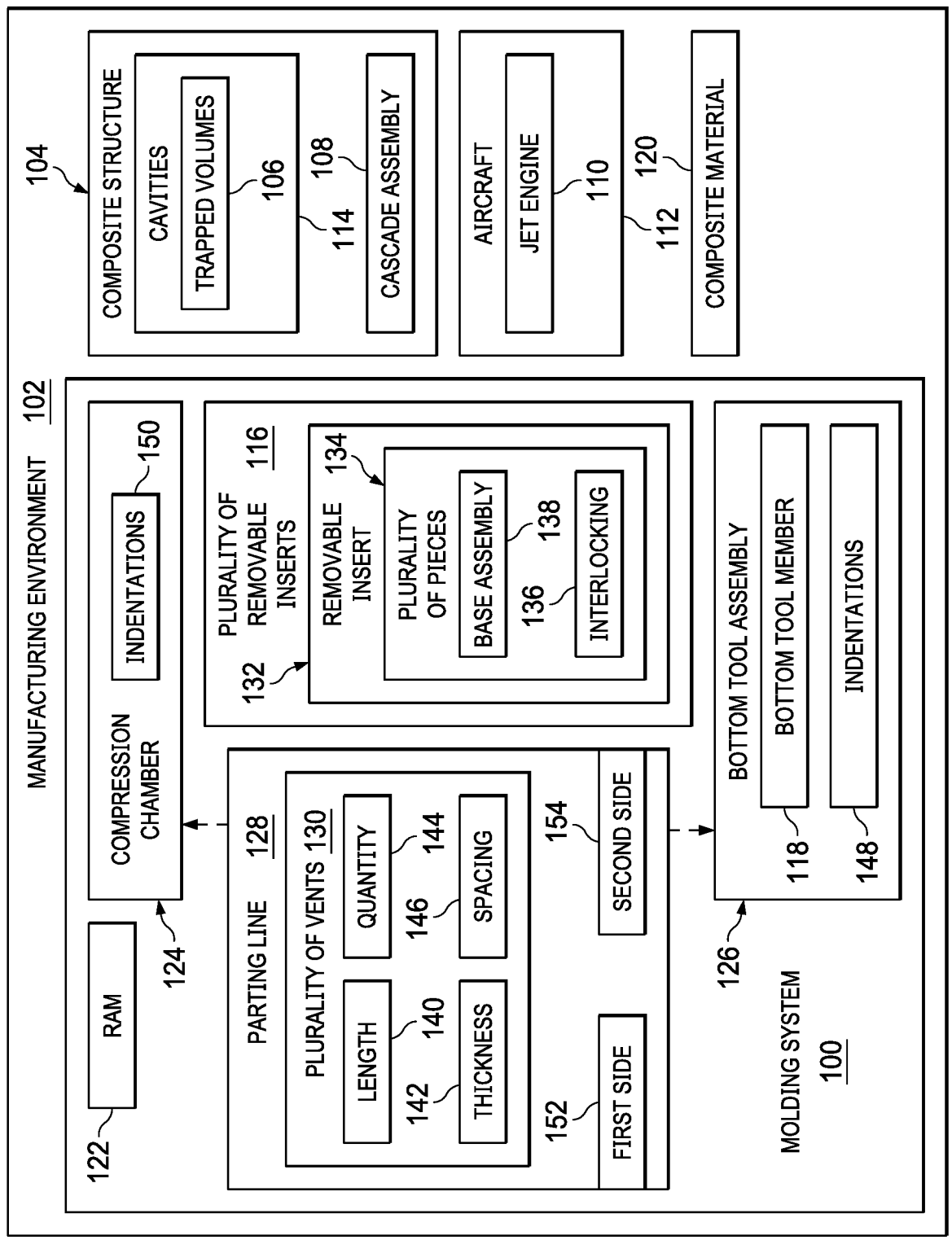
FIG. 1 is an illustration of a block diagram of a manufacturing environment in which a molding system operates in accordance with an illustrative example.

The illustrative examples recognize and take into account one or more different considerations. For example, the illustrative examples recognize and take into account that there are several different types of components with curved, angled, or otherwise shaped walls that create cavities with complex shapes. The cavities with the complex shapes may deter removal of tooling from the cavities.

The illustrative examples recognize and take into account that composite materials are tough, light-weight materials created by combining two or more functional components. A composite material includes reinforcing fibers bound in a polymer resin matrix. The fibers may be unidirectional or may take the form of a woven cloth or fabric. Composite materials include at least one of thermoplastic materials or thermoset materials.

The illustrative examples recognize and take into account that airplanes with jet engines are often equipped with thrust reversers that increase drag on the airplane during landings, thereby reducing the speed of the aircraft. The illustrative examples recognize and take into account that a thrust reverser increases drag by effectively reversing the flow of exhaust gases through the jet engine. In one type of thrust reverse, referred to as a cascade-type, a transcowl on the jet engine nacelle translates rearwardly to expose a cascade formed by multiple open grid panels. Closing of a blocker door causes a bypass portion of the airflow through the engine to be diverted through a series of circumferentially arranged cascade vanes in the grid panels which are oriented to redirect the airflow forwardly and thereby produce reverse thrust.

The illustrative examples recognize and take into account that in cascades, the vanes, which provide the forward turning, and the strongbacks, which provide the side turning, have both curved and straight sections. The illustrative examples recognize and take into account that the curved sections are on the inner side and the straight sections are on the outer side. The illustrative examples recognize and take into account that the geometry of traditional cascades makes removing a simple mold insert from the passages created by the vanes and strongbacks of the cascade impossible or undesirably difficult. The illustrative examples recognize and take into account that the geometry of cascades makes filling the entirety of the compression mold difficult.

The illustrative examples further recognize and take into account that vane wall thickness for a cascade has a small tolerance. The illustrative examples recognize and take into account that greater than basic material shrinkage may result in an undesirable amount of variation in vane wall thickness. The illustrative examples recognize and take into account that tooling design, including design of the inserts, may contribute to variation in the vane wall thickness. The illustrative examples also recognize and take into account that assembly of the mold tool, including the removeable inserts, may contribute to the variation in the vane wall thickness.

During compression molding, a material is compressed around the periphery of an insert to form the compression molded product. When a plurality of inserts is present, the compression molded product is formed between the plurality of inserts as well as between the plurality of inserts and the remainder of the mold.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The illustrative examples recognize and take into account that material gases may be trapped during the plasticizing portion of the compression molding cycle. The illustrative examples recognize and take into account that material gases trapped in a composite material may cause the composite structure to not fill desirably.

The illustrative examples recognize and take into account that gaps or openings in compression mold systems allow for composite material to escape. The illustrative examples recognize and take into account that when material escapes through gaps or openings, it causes flash to be removed from a final composite structure.

The illustrative examples recognize and take into account that gaps or openings in compression mold systems may cause undesirable amounts of material flow. The illustrative examples recognize and take into account that gaps or openings in compression mold systems may cause reduce compression, causing low density in a composite structure.

Turning now to FIG. 1, an illustration of a block diagram of a manufacturing environment in which a molding system operates is depicted in accordance with an illustrative example. Molding system 100 in manufacturing environment 102 is configured to form composite structure 104 having trapped volumes 106. The design of molding system 100 provides for compression molding to form composite structure 104 with a desirable quality.

Composite structure 104 takes any desirable form. In some illustrative examples, composite structure 104 is cascade assembly 108 of jet engine 110 for aircraft 112. Composite structure 104 has trapped volumes 106. Trapped volumes 106 are cavities 114 formed by plurality of removeable inserts 116 within molding system 100.

Prior to forming composite structure 104, plurality of removeable inserts 116 is positioned against bottom tool member 118 and restrained against movement relative to bottom tool member 118. Composite structure 104 is formed from composite material 120 introduced to molding system 100. At least one of pressure or heating is applied to composite material 120 in molding system 100.

To apply pressure, molding system 100 includes ram 122. Ram 122 is moved through compression chamber 124 towards bottom tool assembly 126 including bottom tool member 118. Ram 122 moves towards bottom tool assembly 126 to apply pressure to composite material 120. Compression chamber 124 contacts bottom tool assembly 126 to form parting line 128 of molding system 100. After forming composite structure 104, ram 122 and compression chamber 124 are moved away from bottom tool assembly 126 to expose a surface of composite structure 104.

Molding system 100 comprises plurality of removeable inserts 116, bottom tool assembly 126, and plurality of vents 130. Each removeable insert of plurality of removeable inserts 116 comprises a plurality of pieces configured to be disassembled for removal from composite structure 104. For example, removeable insert 132 comprises plurality of pieces 134 that are interlocking 136. In some illustrative examples, base assembly 138 is one of plurality of pieces 134.

In some illustrative examples, each removeable insert of plurality of removeable inserts 116 comprises a respective base assembly. The respective base assembly is one of the plurality of pieces of the respective removeable insert. For example, removeable insert 132 comprises base assembly 138. Base assembly 138 is one of plurality of pieces 134 forming removeable insert 132. Any desirable quantity of plurality of pieces 134 may nest, interconnect, or otherwise interact with base assembly 138. In these illustrative examples, base assembly 138 may contact bottom tool member 118 when removeable insert 132 is placed in contact with bottom tool member 118. Each removeable insert is configured to be placed in contact with bottom tool assembly 126.

During compression of composite material 120, it is desirable to provide consistent material flow within molding system 100. Further, during compression of composite material 120, it is desirable to fully fill composite structure 104.

To allow for venting of material gases from composite material 120 during compression molding, plurality of vents 130 is formed at parting line 128 of molding system 100. Without plurality of vents 130, gases from composite material 120 could be trapped during the plasticizing portion of the process cycle, causing composite structure 104 not to fill properly.

Plurality of vents 130 is formed at parting line 128 of molding system 100 by being formed in any desirable quantity of components forming parting line 128. When compression chamber 124 and bottom tool assembly 126 form parting line 128, plurality of vents 130 are present in at least one of compression chamber 124 or bottom tool assembly 126.

Plurality of vents 130 has any desirable characteristics. Plurality of vents 130 has any desirable length 140, any desirable thickness 142, any desirable quantity 144, and any desirable spacing 146. Characteristics of plurality of vents 130 are selected to provide sufficient venting of gases from composite material 120 while maintaining compression in molding system 100. Characteristics of plurality of vents 130 are selected to provide sufficient venting of gases from composite material 120 to provide desirable fill of composite structure 104 without creating undesirable flash on composite structure 104. Characteristics of plurality of vents 130 are selected to provide sufficient venting of gases from composite material 120 to provide desirable fill of composite structure 104 without causing undesirable material flow. Characteristics of plurality of vents 130 are selected to provide sufficient venting of gases from composite material 120 to provide desirable fill of composite structure 104 without causing undesirable density in composite structure 104.

Length 140 of each of plurality of vents 130 is selected such that composite material 120 does not undesirably exit plurality of vents 130. In some illustrative examples, each of plurality of vents 130 has length 140 in the range of about 0.5 inch to about 1.5 inches.

In some illustrative examples, each of plurality of vents 130 has thickness 142 in the range of about 0.001 inch to about 0.003 inch. Thickness 142 of each of plurality of vents 130 is selected such that composite material 120 does not undesirably exit plurality of vents 130.

Plurality of vents 130 is positioned on any desirable portion of parting line 128. In some illustrative examples, plurality of vents 130 is positioned on one side of molding system 100. In some illustrative examples, plurality of vents 130 is positioned on at least two sides of molding system 100. In some illustrative examples, plurality of vents 130 is positioned on two opposing sides of molding system 100. In some illustrative examples, plurality of vents 130 is positioned such that gases are able to escape through opposing sides of molding system 100. In some illustrative examples, plurality of vents 130 is positioned on all sides of parting line 128.

In some illustrative examples, plurality of vents 130 comprises no more than six vents on each side of molding system 100. In these illustrative examples, quantity 144 of plurality of vents 130 is no greater than six vents on each side of molding system 100. In these illustrative examples, each side of molding system 100 has any desirable quantity of vents between zero and six.

In some illustrative examples, each vent is evenly spaced along a side of parting line 128. In these illustrative examples, spacing 146 for plurality of vents 130 along a side of parting line 128 is the same. For example, spacing 146 for vents along first side 152 of parting line 128 is the same across first side 152.

In some illustrative examples, each vent is separated from an adjacent vent by at least six inches. In these illustrative examples, each vent is separated from each of the other vents of plurality of vents 130 by at least six inches. In these illustrative examples, spacing 146 of plurality of vents 130 is at least six inches.

In some illustrative examples, plurality of vents 130 is formed by indentations 148 in bottom tool assembly 126. Indentations 148 may be formed by machining, molding, or any other desirable manufacturing process.

Bottom tool assembly 126 includes any desirable quantity of components. When indentations 148 are in bottom tool assembly 126, indentations 148 are present in a number of components of bottom tool assembly 126. In some illustrative examples, indentations 148 are present in one component of bottom tool assembly 126. In other illustrative examples, indentations 148 are present in more than one component of bottom tool assembly 126.

In some illustrative examples, plurality of vents 130 is formed by indentations 150 in compression chamber 124 configured to form parting line 128 of molding system 100 with bottom tool assembly 126. Indentations 150 may be formed by machining, molding, or any other desirable manufacturing process. In some illustrative examples, plurality of vents 130 is formed by both indentations 148 in bottom tool assembly 126 and indentations 150 in compression chamber 124.

In some illustrative examples, molding system 100 comprises plurality of removeable inserts 116, bottom tool assembly 126, parting line 128, and plurality of vents 130. Each removeable insert of plurality of removeable inserts 116 comprises a plurality of pieces configured to be disassembled for removal from composite structure 104. Each removeable insert is configured to be placed in contact with bottom tool assembly 126. Parting line 128 of molding system 100 is formed by bottom tool assembly 126 and compression chamber 124. Plurality of vents 130 is on first side 152 and second side 154 of molding system 100 along parting line 128. First side 152 and second side 154 are opposing sides of molding system 100.

In some illustrative examples, plurality of vents 130 have length 140 in the range of about 1.0 inch to about 1.5 inches, with vents evenly separated at parting line 128. In some illustrative examples, there are no more than six vents per side of molding system 100 to minimize flash.

In some illustrative examples, vents of plurality of vents 130 have thickness 142 of no more than 0.003 inch. Maintaining thickness 142 at no more than 0.003 inch protects against composite material 120 escaping during heavy compression or dwell periods during the molding process.

Plurality of vents 130 are configured to allow gases to escape from composite material 120 during compression molding. Allowing gases to escape during compression molding of composite material 120 reduces or eliminates inconsistencies, such as part occlusions, in composite structure 104.

Plurality of vents 130 allows consistent material flow towards plurality of vents 130. Plurality of vents 130 also enables improved cycle time for composite structure 104. For example, by allowing gases to escape through plurality of vents 130, material flow rate is increased to areas of molding system 100. By increasing material flow rate within molding system 100, cycle time is improved.

The illustration of manufacturing environment 102 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

Figure 2:
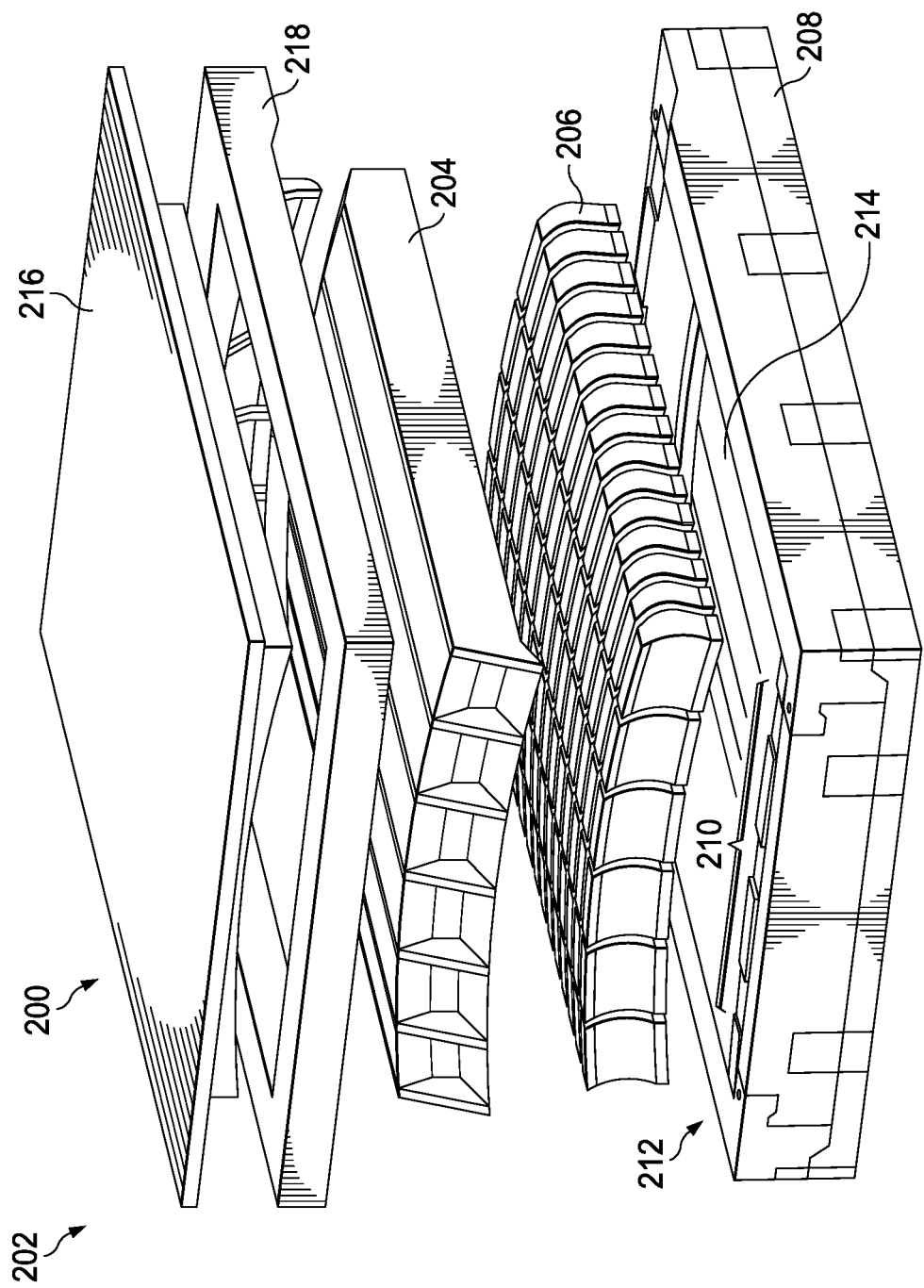
FIG. 2 is an illustration of a molding system with a plurality of removeable inserts and a molded composite structure in accordance with an illustrative example.

Turning now to FIG. 2, an illustration of a molding system with a plurality of removeable inserts and a molded composite structure is depicted in accordance with an illustrative example. Molding system 200 is a physical implementation of molding system 100 of FIG. 1. In manufacturing environment 202, composite structure 204 is formed using molding system 200. Composite structure 204 takes any desirable form. In some illustrative examples, composite structure 204 is a cascade assembly for a jet engine of an aircraft.

Molding system 200 is configured to form composite structure 204 having trapped volumes (not depicted). Molding system 200 comprises plurality of removeable inserts 206, bottom tool assembly 208, and plurality of vents 210 formed at parting line 212 of molding system 200. Each removeable insert of plurality of removeable inserts 206 comprises a plurality of pieces configured to be disassembled for removal from composite structure 204.

Each removeable insert is configured to be placed in contact with bottom tool assembly 208. Bottom tool member 214 is a portion of bottom tool assembly 208. In some illustrative examples, bottom tool member 214 may be referred to as a mold plate or a bottom mold plate. Each removeable insert is configured to be placed in contact with bottom tool member 214.

As depicted, molding system 200 also comprises ram 216 and compression chamber 218. Bottom tool assembly 208 is configured to contact compression chamber 218 to form a chamber for compression molding of composite material to form composite structure 204.

Bottom tool assembly 208 comprises any desirable quantity of connected components. In some illustrative examples, bottom tool assembly 208 is a single component. In some illustrative examples, bottom tool assembly 208 comprises a plurality of connected components. In some illustrative examples, each side of bottom tool assembly 208 is moveable relative to bottom tool member 214. In some illustrative examples, each side of bottom tool assembly 208 is rotatable relative to bottom tool member 214. In some illustrative examples, each side of bottom tool assembly 208 is removeable relative to bottom tool member 214.

The illustration of molding system 200 in FIG. 2 is not meant to imply physical or architectural limitations to the manner in which an illustrative example may be implemented. Other components in addition to or in place of the ones illustrated may be used. For example, bottom tool assembly 208 may be removably secured to a base of a compression molding machine. In some illustrative examples, molding system 200 may be removably secured to a heating system.

Further, the shape, size, and quantity of plurality of removeable inserts 206 are only illustrative in FIG. 2. Plurality of removeable inserts 206 may include any desirable quantity, size, and shape of removeable inserts to create a composite structure having a desired shape.

Yet further, in some non-depicted illustrative examples, a plurality of restraints may be present to restrain movement of plurality of removeable inserts 206 relative to bottom tool assembly 208. The plurality of restraints may take any desirable form of physical restraint.

Figure 3:
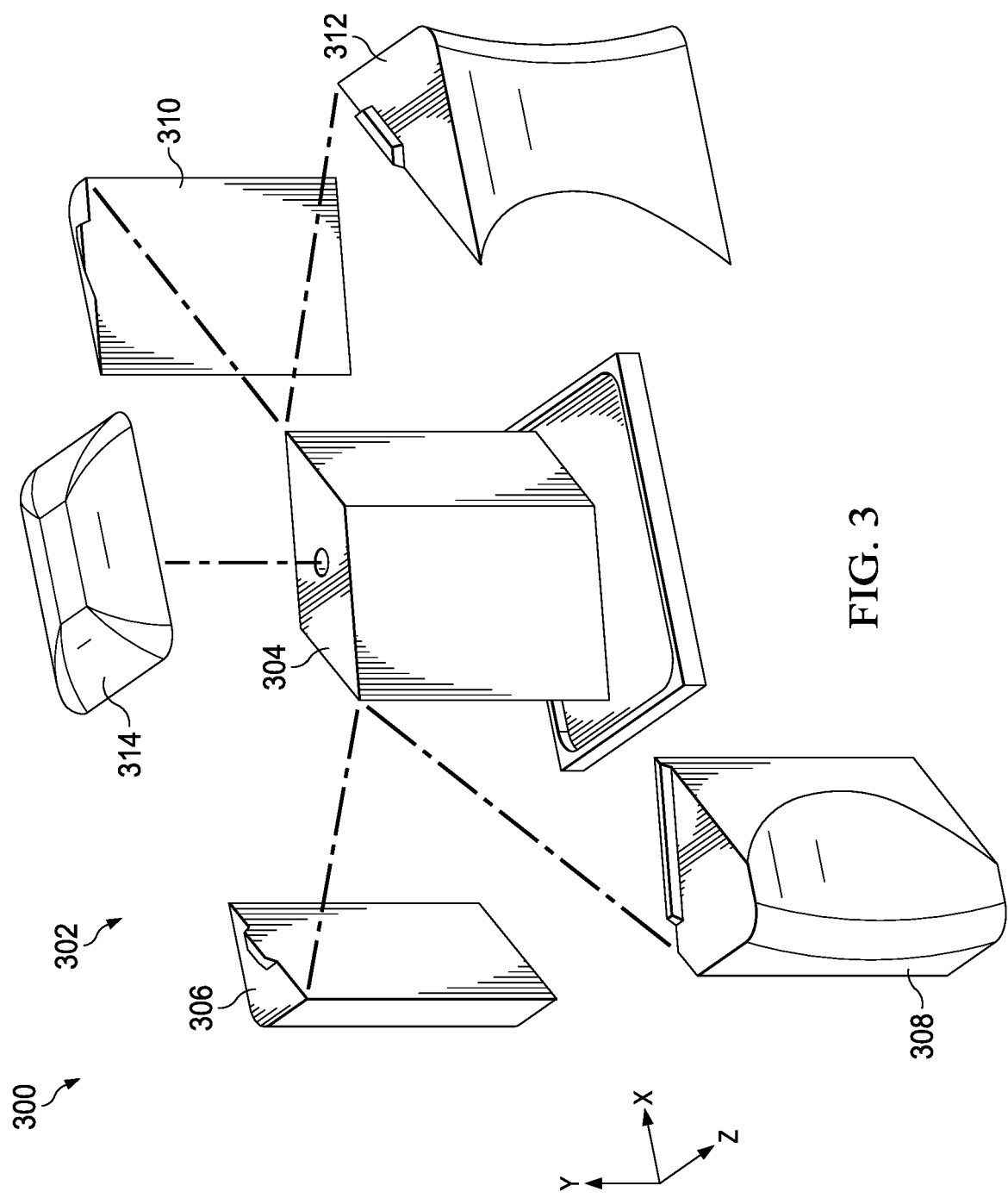
FIG. 3 is an illustration of an exploded view of a removeable insert of a molding system in accordance with an illustrative example.

Turning now to FIG. 3, an illustration of an exploded view of a removeable insert of a molding system is depicted in accordance with an illustrative example. Removeable insert 300 is a physical implementation of removeable insert 132 of FIG. 1. In some illustrative examples, removeable insert 300 is one of plurality of removeable inserts 206 of FIG. 2.

Removeable insert 300 comprises plurality of pieces 302 configured to be disassembled for removal from a composite structure. Plurality of pieces 302 comprises base assembly 304. Piece 306, piece 308, piece 310, piece 312, and piece 314 are interconnecting. In an assembled configuration (not depicted), piece 306, piece 308, piece 310, and piece 312 are in contact with base assembly 304. Piece 314 acts as a cap when removeable insert 300 is in an assembled configuration (not depicted). In an assembled configuration (not depicted), plurality of pieces 302 of removeable insert 300 are interconnected. In an assembled configuration (not depicted), plurality of pieces 302 of removeable insert 300 have restricted movement relative to each other.

In an assembled configuration (not depicted), piece 306, piece 308, piece 310, and piece 312 are seated in base assembly 304. In an assembled configuration (not depicted), piece 314 is connected to each of piece 306, piece 308, piece 310, and piece 312.

To form a structure using compression molding, removeable insert 300 is installed in a molding system, such as molding system 100 of FIG. 1, in an assembled configuration. After molding a composite structure, such as composite structure 104, using removeable insert 300, removeable insert 300 may be disassembled and removed, piece by piece, from a cavity in the composite structure.

The illustration of removeable insert 300 in FIG. 3 is not meant to imply physical or architectural limitations to the manner in which an illustrative example may be implemented. Removeable insert 300 is only one exemplary insert for illustrative purposes. Removeable insert 300 may include any desirable quantity of pieces and desirable shape of pieces to form a composite structure having a desired shape. Removeable insert 300 may include any desirable quantity of pieces and desirable shape of pieces to enable removal of removeable insert 300 from a cavity of the composite structure after the compression molding operation. Removeable insert 300 is comprised of any desirable material including at least one of a metallic material, a ceramic material, or any other suitable material selected to operate desirably within a compression molding operation. In some illustrative examples, removeable insert 300 is configured to be restrained against movement relative to a bottom tool member of a molding system.

Figure 4:
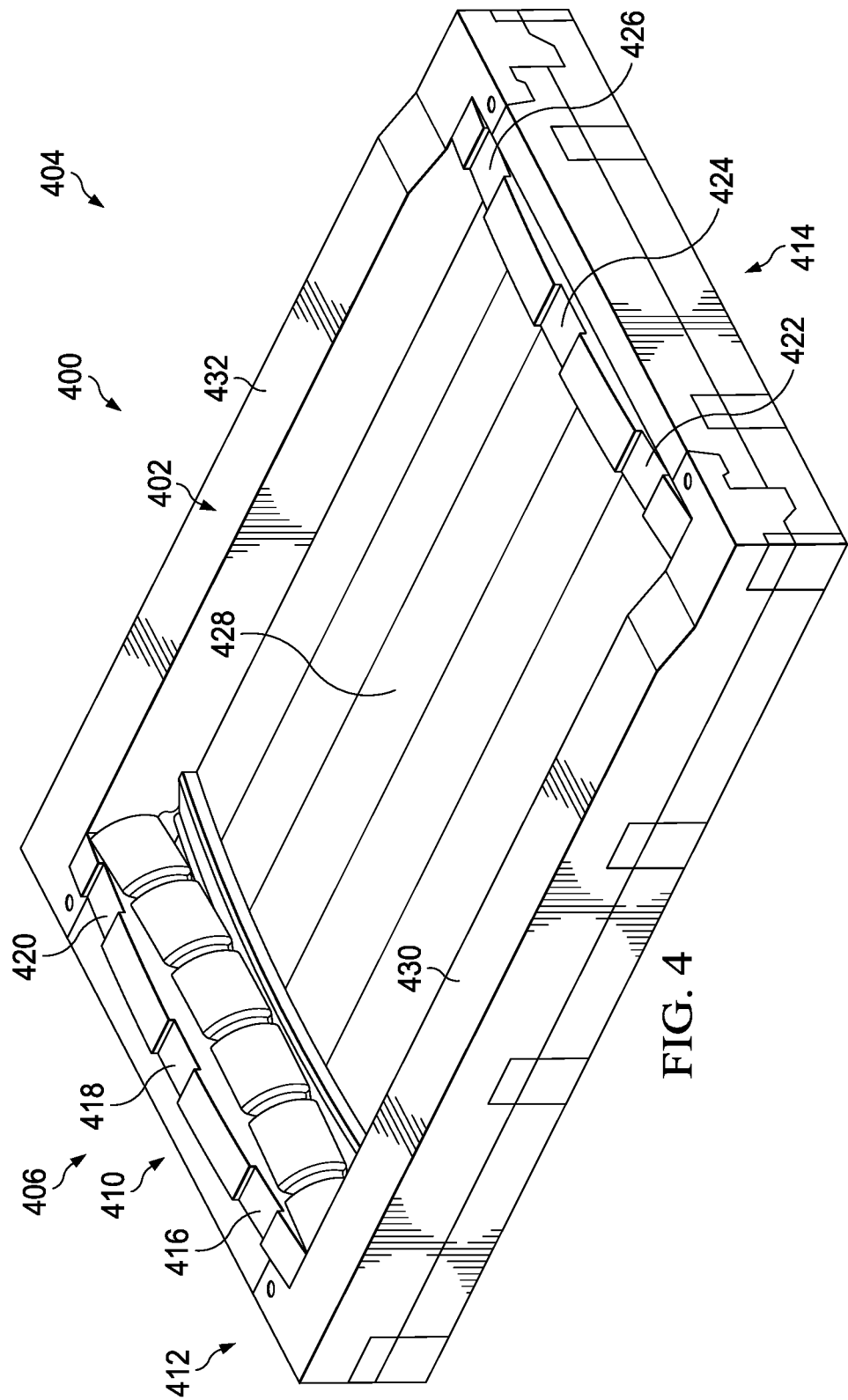
FIG. 4 is an illustration of a bottom tool assembly with vents in accordance with an illustrative example.

Turning now to FIG. 4, an illustration of a bottom tool assembly with vents is depicted in accordance with an illustrative example. Bottom tool assembly 400 is a physical implementation of bottom tool assembly 126 of FIG. 1. In some illustrative examples, bottom tool assembly 400 is the same as bottom tool assembly 208 of FIG. 2.

Bottom tool assembly 400 has upper surface 402. Upper surface 402 is configured to contact a contact surface of a compression chamber to form a parting line of a molding system, such as molding system 100 of FIG. 1.

In view 404, upper surface 402 has plurality of vents 406. Plurality of vents 406 take the form of indentations 410. Indentations 410 are machined into or otherwise formed into upper surface 402. Plurality of vents 406 allows for gases to escape a composite material during compression molding in a mold system comprising bottom tool assembly 400.

As depicted, plurality of vents 406 is positioned on first side 412 and second side 414 of bottom tool assembly 400. First side 412 and second side 414 are opposite sides of bottom tool assembly 400. As depicted, plurality of vents 406 is positioned on at least two sides of the molding system formed using bottom tool assembly 400. As depicted, plurality of vents 406 is positioned on two opposing sides of the molding system formed using bottom tool assembly 400. As depicted, vent 416, vent 418, and vent 420 are present on first side 412 of bottom tool assembly 400. As depicted, vent 422, vent 424, and vent 426 are present on second side 414 of bottom tool assembly 400.

As depicted, vent 416, vent 418, and vent 420 are evenly spaced on first side 412. As depicted, vent 422, vent 424, and vent 426 are evenly spaced on second side 414.

Bottom tool member 428 is a portion of bottom tool assembly 400. In some illustrative examples, bottom tool member 428 may be referred to as a mold plate or a bottom mold plate. Bottom tool assembly 400 comprises any desirable quantity of connected components. Upper surface 402 is formed by first side 412, second side 414, third side 430, and fourth side 432 of bottom tool assembly 400.

In some illustrative examples, bottom tool assembly 400 is a single component. In some illustrative examples, bottom tool assembly 400 comprises a plurality of connected components. In some illustrative examples, each side of bottom tool assembly 400 is moveable relative to bottom tool member 428. In some illustrative examples, each side of bottom tool assembly 400 is rotatable relative to bottom tool member 428. In some illustrative examples, each side of bottom tool assembly 400 is removeable relative to bottom tool member 428.

The illustration of bottom tool assembly 400 in FIG. 4 is not meant to imply physical or architectural limitations to the manner in which an illustrative example may be implemented. Bottom tool assembly 400 is only one exemplary tool assembly with vents for illustrative purposes. In some non-depicted examples, vents may be present only on third side 430 and fourth side 432. In some non-depicted examples, vents may be present on each of first side 412, second side 414, third side 430, and fourth side 432.

The quantity of vents and spacing of vents is provided only for illustrative purposes. In some non-depicted examples, a different quantity of vents is present on at least one of first side 412 or second side 414. In some non-depicted examples, a different spacing of vents is present on at least one of first side 412 or second side 414.

In some illustrative examples, bottom tool assembly 400 and a corresponding compression chamber each have vents. In some non-depicted examples, a bottom tool assembly does not have vents. In these non-depicted examples, a corresponding compression chamber has vents.

Figure 5:
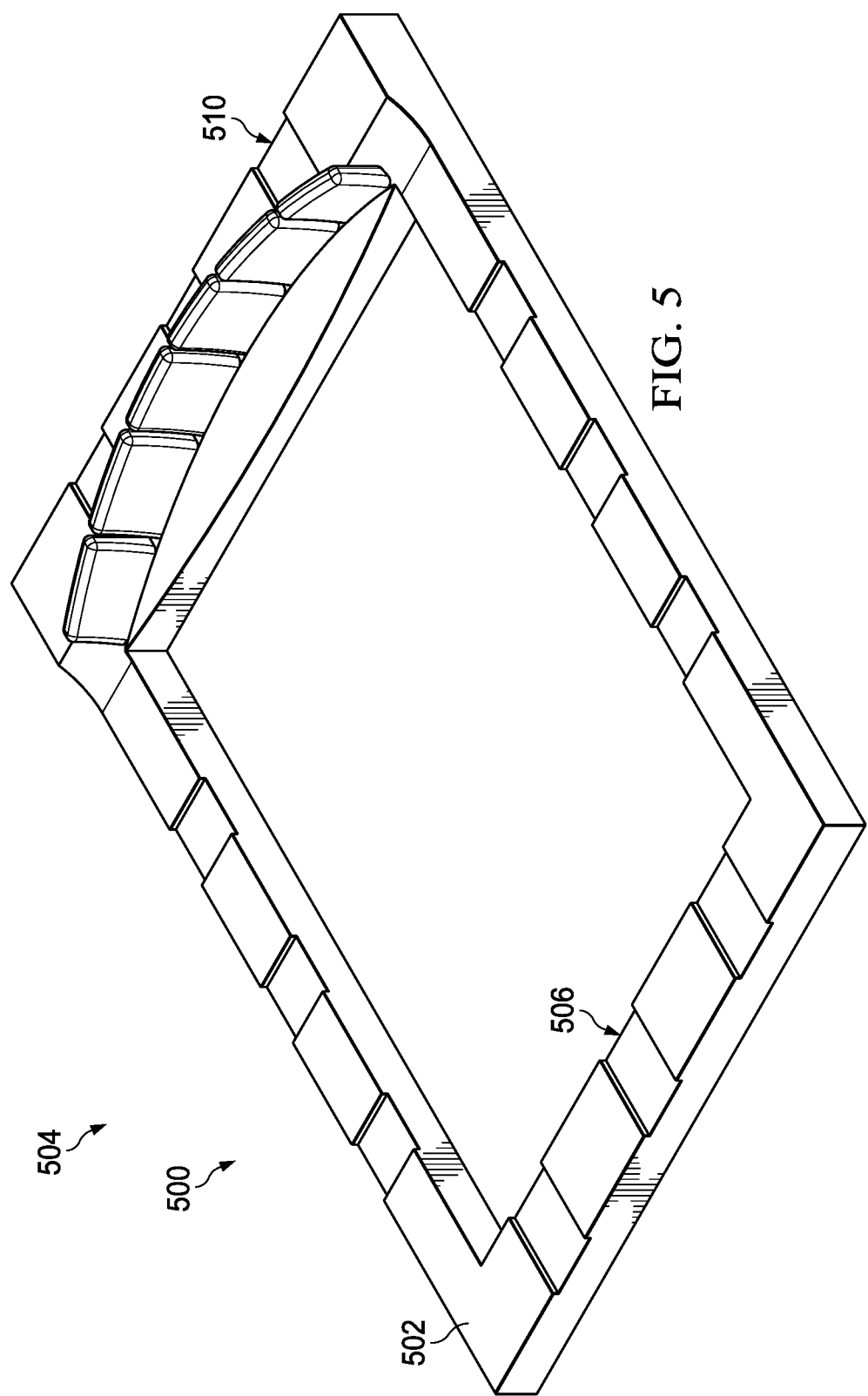
FIG. 5 is an illustration of a compression chamber with vents in accordance with an illustrative example.

Turning now to FIG. 5, an illustration of a compression chamber with vents is depicted in accordance with an illustrative example. Compression chamber 500 is a physical implementation of compression chamber 124 of FIG. 1. In some illustrative examples, compression chamber 500 is the same as compression chamber 218 of FIG. 2.

Compression chamber 500 has contact surface 502. Contact surface 502 is configured to contact an upper surface of a bottom tool assembly to form a parting line of a molding system, such as molding system 100 of FIG. 1. In some illustrative examples, contact surface 502 is configured to contact upper surface 402 of bottom tool assembly 400 of FIG. 4.

In view 504, contact surface 502 has plurality of vents 506. Plurality of vents 506 takes the form of indentations 510. Indentations 510 are machined into or otherwise formed into contact surface 502. Plurality of vents 506 allows for gases to escape a composite material during compression molding in a mold system comprising compression chamber 500.

As depicted, plurality of vents 506 is positioned on at least two sides of compression chamber 500. As depicted, plurality of vents 506 is positioned on all four sides of compression chamber 500.

The illustration of compression chamber 500 in FIG. 5 is not meant to imply physical or architectural limitations to the manner in which an illustrative example may be implemented. Compression chamber 500 is only one exemplary mold structure with vents for illustrative purposes. The quantity of vents and spacing of vents is provided only for illustrative purposes.

Figure 6:
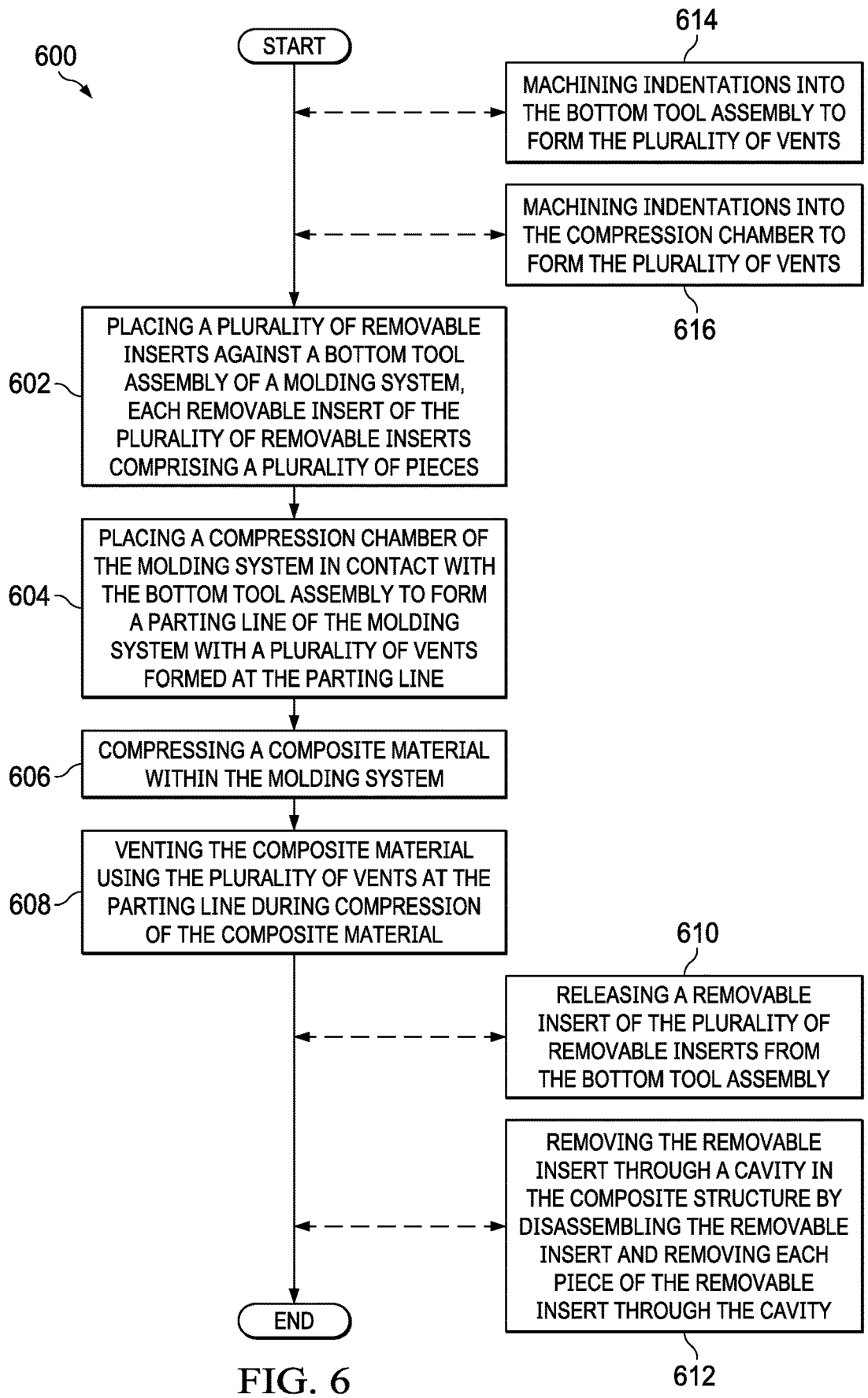
FIG. 6 is an illustration of a flowchart of a method for forming a composite structure using a molding system in accordance with an illustrative example.

Turning now to FIG. 6, an illustration of a flowchart of a method for forming a composite structure using a molding system is depicted in accordance with an illustrative example. Method 600 may be performed using molding system 100 of FIG. 1. Method 600 may be used to form composite structure 104 of FIG. 1. Method 600 may use molding system 200 of FIG. 2. Bottom tool assembly 400 of FIG. 4 may be used in method 600. Compression chamber 500 of FIG. 5 may be used in method 600.

Method 600 places a plurality of removeable inserts against a bottom tool assembly of a molding system, each removeable insert of the plurality of removeable inserts comprising a plurality of pieces (operation 602). Method 600 places a compression chamber of the molding system in contact with the bottom tool assembly to form a parting line of the molding system with a plurality of vents formed at the parting line (operation 604). Method 600 compresses a composite material within the molding system (operation 606).

In some illustrative examples, composite material is placed into the cavity of the molding system prior to placing the compression member of the molding system in contact with the bottom tool assembly. In some illustrative examples, composite material is introduced into the cavity of the molding system after placing the compression member in contact with the bottom tool assembly. After placing the composite material into the cavity of the molding system, the molding system applies light pressure on the composite material. Heat is applied to the composite material within the molding system. In some illustrative examples, as the composite material melts and starts to flow, pressure is increased. In some illustrative examples, increased pressure is applied to the composite material during heating to perform the compression molding.

Method 600 vents the composite material using the plurality of vents at the parting line during compression of the composite material (operation 608). Afterwards, method 600 terminates.

In some illustrative examples, method 600 releases a removeable insert of the plurality of removeable inserts from the bottom tool assembly (operation 610). In some illustrative examples, method 600 removes the removeable insert through a cavity in the composite structure by disassembling the removeable insert and removing each piece of the removeable insert through the cavity (operation 612).

In some illustrative examples, method 600 machines indentations into the bottom tool assembly to form the plurality of vents (operation 614). In some illustrative examples, the indentations are machined into the components of the bottom tool assembly prior to assembling the components into the bottom tool assembly. In some illustrative examples, method 600 machines indentations into the compression chamber to form the plurality of vents (operation 616).

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 600 are performed. For example, operations 610 through 616 of FIG. 6 are optional.

Figure 7:
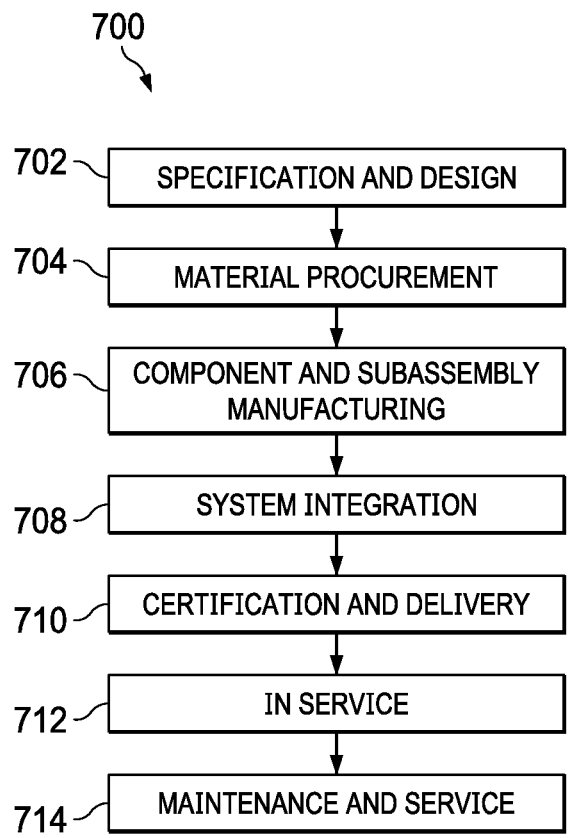
FIG. 7 is an illustration of an aircraft manufacturing and service method in a form of a block diagram in accordance with an illustrative example.
Figure 8:
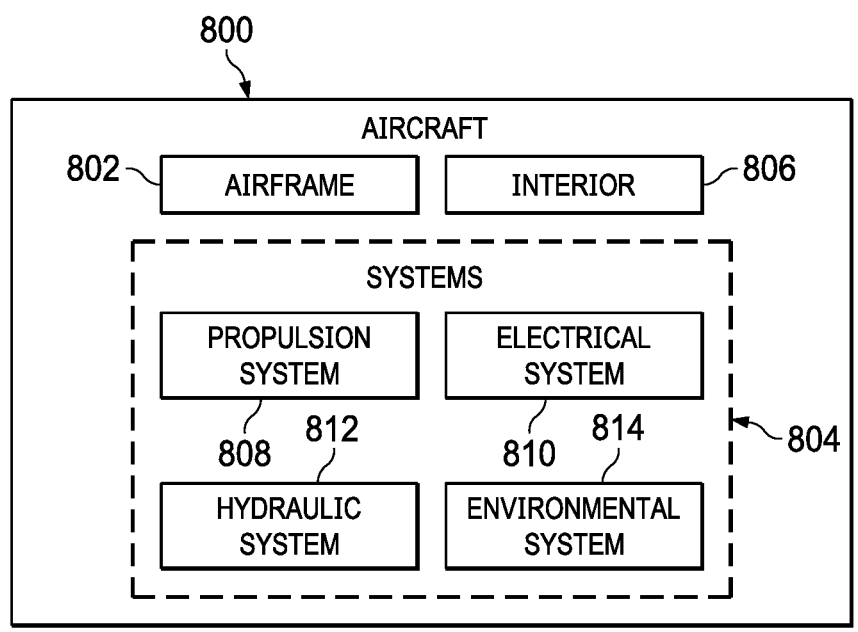
FIG. 8 is an illustration of an aircraft in a form of a block diagram in which an illustrative example may be implemented.

The illustrative examples of the present disclosure may be described in the context of aircraft manufacturing and service method 700 as shown in FIG. 7 and aircraft 800 as shown in FIG. 8. Turning first to FIG. 7, an illustration of an aircraft manufacturing and service method is depicted in accordance with an illustrative example. During pre-production, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for maintenance and service 714, which may include modification, reconfiguration, refurbishment, and other maintenance or service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 8, an illustration of an aircraft is depicted in which an illustrative example may be implemented. In this example, aircraft 800 is produced by aircraft manufacturing and service method 700 in FIG. 7 and may include airframe 802 with a plurality of systems 804 and interior 806. Examples of systems 804 include one or more of propulsion system 808, electrical system 810, hydraulic system 812, and environmental system 814. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 700. One or more illustrative examples may be used during component and subassembly manufacturing 706, system integration 708, or maintenance and service 714 of FIG. 7. For example, molding system 100 may be used to form cascade assembly 108 of aircraft 800, during component and subassembly manufacturing 706. As another example, cascade assembly 108 may be a replacement part used to replace a pre-existing cascade assembly during maintenance and service 714 of FIG. 7.

The illustrative examples provide a molding system with venting of a compression mold at a parting line. The venting allows material gases to escape during the plasticizing portion of the process cycle. The venting prevents trapping gas in the composite material. The venting thus enables the composite structure to fill desirably. The venting reduces or eliminates part occlusions in the composite structure. The venting allows consistent material flow towards vents and enables improved cycle time.

In some illustrative examples, the venting is provided by about 1.0 inch to about 1.5 inches wide vents evenly separated at the parting line. In some illustrative examples, the venting is provided by no more than six vents per side of the molding tool to minimize flash. In some illustrative examples, vents are no more than 0.003 inch deep to reduce or prevent escape of the composite material during heavy compression or dwell periods during the molding process.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A compression molding system for forming a composite structure having trapped volumes, the compression molding system comprising:
   a plurality of removeable inserts, each removeable insert of the plurality of removeable inserts comprising a plurality of pieces configured to be disassembled for removal from the composite structure;
   a bottom tool assembly, wherein each removeable insert is configured to be placed in contact with the bottom tool assembly; and
   a plurality of vents present at a parting line of the compression molding system, wherein the plurality of vents take the form of at least one of indentations in the bottom tool assembly or indentations in a compression chamber configured to form the parting line of the compression molding system with the bottom tool assembly;
   wherein each of the plurality of vents has a length and a thickness configured to allow gases to escape from a composite material during compression molding of the composite material and configured to protect against the composite material escaping during compression or dwell periods in a molding process.

2. The compression molding system of claim 1, wherein each of the plurality of vents has a length in a range of about 0.5 inch to about 1.5 inches.

3. The compression molding system of claim 1, wherein each of the plurality of vents has a thickness in a range of about 0.001 inch to about 0.003 inch.

4. The compression molding system of claim 1, wherein the plurality of vents is positioned on at least two sides of the compression molding system.

5. The compression molding system of claim 1, wherein the plurality of vents comprises no more than six vents on each side of the compression molding system.

6. The compression molding system of claim 1, wherein each vent is separated from an adjacent vent by at least six inches.

7. A compression molding system for forming a composite structure having trapped volumes, the compression molding system comprising:
- a plurality of removeable inserts, each removeable insert of the plurality of removeable inserts comprising a plurality of pieces configured to be disassembled for removal from the composite structure;
- a bottom tool assembly, wherein each removeable insert is configured to be placed in contact with the bottom tool assembly;
- a parting line of the compression molding system formed by the bottom tool assembly and a compression chamber; and
- a plurality of vents on a first side and a second side of the compression molding system along the parting line, wherein the first side and the second side are opposing sides of the compression molding system;
- wherein each of the plurality of vents has a length and a thickness configured to allow gases to escape from a composite material during compression molding of the composite material and configured to protect against the composite material escaping during compression or dwell periods in a molding process.

8. The compression molding system of claim 7, wherein each of the plurality of vents has a length in a range of about 0.5 inch to about 1.5 inches.

9. The compression molding system of claim 7, wherein each of the plurality of vents has a thickness in a range of about 0.001 inch to about 0.003 inch.

10. The compression molding system of claim 7, wherein the plurality of vents comprises no more than six vents on each side of the compression molding system.

11. The compression molding system of claim 7, wherein each vent is separated from an adjacent vent by at least six inches.

12. The compression molding system of claim 7, wherein the plurality of vents take the form of indentations in the bottom tool assembly.

13. The compression molding system of claim 7, wherein the plurality of vents take the form of indentations in a compression chamber.

14. A method of forming a composite structure having trapped volumes using a molding system, the method comprising:
- placing a plurality of removeable inserts against a bottom tool assembly of the molding system, each removeable insert of the plurality of removeable inserts comprising a plurality of pieces configured to be disassembled for removal from the composite structure;
- placing a compression chamber of the molding system in contact with the bottom tool assembly to form a parting line of the molding system with a plurality of vents formed at the parting line, wherein each removeable insert is configured to be placed in contact with the bottom tool assembly, and wherein the plurality of vents take the form of at least one of indentations in the bottom tool assembly or indentations in a compression chamber configured to form the parting line of the compression molding system with the bottom tool assembly;
- compressing a composite material within the molding system; and
- venting the composite material using the plurality of vents at the parting line during compression of the composite material, wherein each of the plurality of vents has a length and a thickness configured to allow gases to escape from the composite material during compression molding of the composite material and configured to protect against the composite material escaping during compression or dwell periods in a molding process.

15. The method of claim 14 further comprising:
releasing a removeable insert of the plurality of removeable inserts from the bottom tool assembly; and
removing the removeable insert through a cavity in the composite structure by disassembling the removeable insert and removing each piece of the removeable insert through the cavity.

16. The method of claim 14 further comprising:
machining indentations into the bottom tool assembly to form the plurality of vents.

17. The method of claim 14 further comprising:
machining indentations into the compression chamber to form the plurality of vents.

* * * * *